United States Patent [19]

Langler

[11] Patent Number: 4,847,098
[45] Date of Patent: Jul. 11, 1989

[54] DUAL TEXTURED FOOD PIECE OF ENHANCED STABILITY

[75] Inventor: James E. Langler, White Bear Lake, Minn.

[73] Assignee: General Mills, Inc., Minneapolis, Minn.

[21] Appl. No.: 169,911

[22] Filed: Mar. 18, 1988

[51] Int. Cl.⁴ .................. A23L 1/064; A23L 1/035; A23L 1/04
[52] U.S. Cl. .................. 426/102; 426/274; 426/282; 426/615; 426/601; 426/602; 426/604
[58] Field of Search .................. 426/89, 99, 98, 102, 426/103, 274, 279, 281, 282, 284, 302, 615, 601, 602, 604

[56] References Cited

U.S. PATENT DOCUMENTS

| | | | |
|---|---|---|---|
| 1,648,359 | 11/1927 | Newman | 426/284 |
| 2,906,626 | 9/1959 | Eagon et al. | 426/602 |
| 4,157,402 | 6/1979 | Ogawa et al. | 426/5 |
| 4,305,970 | 12/1981 | Moran et al. | 426/603 |
| 4,389,426 | 6/1983 | Reissmann et al. | 426/602 |
| 4,401,681 | 8/1983 | Dahle | 426/94 |
| 4,404,231 | 9/1983 | den Hollander et al. | 426/602 |
| 4,410,552 | 10/1983 | Gaffney et al. | 426/103 |
| 4,430,351 | 2/1984 | Cillario | 426/103 |
| 4,444,799 | 4/1984 | Canderveer et al. | 426/549 |
| 4,446,165 | 5/1984 | Roberts | 426/602 |
| 4,450,179 | 5/1984 | Vink et al. | 426/103 |
| 4,468,408 | 8/1984 | Bosco et al. | 426/604 |
| 4,517,205 | 5/1985 | Aldrich | 426/103 |
| 4,533,561 | 8/1985 | Ward | 426/603 |
| 4,587,131 | 5/1986 | Bodor et al. | 426/603 |
| 4,596,714 | 6/1986 | Brabbs | 426/297 |
| 4,661,360 | 4/1987 | Smith | 426/94 |
| 4,684,534 | 8/1987 | Valentine | 427/3 |
| 4,689,238 | 8/1987 | Hitchner | 426/571 |

*Primary Examiner*—Donald E. Czaja
*Assistant Examiner*—Helen Pratt
*Attorney, Agent, or Firm*—John A. O'Toole

[57] ABSTRACT

Disclosed are improved, dual textured food products comprising a portion of one texture and a second portion of a different texture that exhibits enhanced shelf life stability. Preferred food products are fruit snack pieces comprising a soft, supportive, fruit-containing shell portion and a second, more fluid, variably textured core portion. The shell portion can comprise a dehydrated fruit puree composition. The core portion can comprise novel w/o emulsions characterized by low fat levels and defined gelled phases.

24 Claims, No Drawings the most troublesome types of structural instability. A variety of problems exist with regard to having a fat based intermediate barrier. For example, in order to assure complete segregation between the dissimilar regions, it has been previously thought that the fat based layer must be relatively thick. Still another problem is that such fat barriers tend to deteriorate over time due to the development of microfissures which can be aggravated by repeated temperature cycling. Still another problem with fat based barriers is that such fats upon consumption frequently exhibit an undesirably waxy chew or waxy mouthfeel. Finally, high fat levels are inconsistent with the perception of wholesomeness in some food products.

DUAL TEXTURED FOOD PIECE OF ENHANCED STABILITY

TECHNICAL FIELD

The present invention relates to food products. More particularly, the present invention relates to food articles having a dual texture comprising a relatively hard phase and a relatively soft phase, especially fruit snacks with a soft interior.

BACKGROUND OF THE INVENTION

Snacks based upon fruit compositions have enjoyed increased popularity recently. Popular shapes include fruit leathers, e.g., Fruit Corners brand fruit rollups. Also popular are similar compositions but in bar form, for example, Fruit Corners brand fruit bars. Still another popular form of fruit compositions are in individual bite size pieces such as Fruit Corners brand fruit bits.

While popular, consumers especially children have come to expect as well as to desire new and interesting fruit based snack compositions. To this end, for example, fruit bars have been fabricated with intermediate regions or portions of a creamy nougat material comprising sugars and shortening, see for example, Fruit Corners Fruit Swirls brand fruit bars. Such products are characterized by not only a visual contrast between the fruit phase and nougat phase portions of the product but also by modest textural differences between the portions.

While the small textural differences between the fruit portion and the solid, creamy flavored nougat portions are desirable, a more pronounced difference in texture or "dual texture" would be even more desirable. For example, it would be desirable to fabricate a food article having a first solid portion and a second liquid portion. An example of a product of this type is a filled chocolate, i.e., having a chocolate coating of a high fat material (greater than 30%). However, provision of food articles having dissimilar phases is quite difficult to achieve in practice. Food product stability problems complicate the provision of dual textured food products. One problem, especially for fruit products, is microbial stability. Another problem can be emulsion stability. Still another problem is structural stability, i.e., maintaining the texture differences between the different portions over time.

A natural tendency is the migration of materials from one portion to the other at their interface due to gradients created by differences in concentration of moisture, sugars, and other soluble materials. While fruit based food articles can be fabricated which are initially characterized by dual portions of dual texture, such composite articles tend to experience fairly rapid deterioration or structural instability over time due to the intermigration between the portions. Center filled fruit products, for example, using known methods experience a softening of the shell and gradual disappearance of the interior.

One common approach to increase stability generally is to maintain the articles at frozen temperatures. However, not all articles are suitable for frozen storage or for consumption at frozen temperatures. Another technique for structural stability is to have an edible barrier intermediate the two regions. Frequently employed as edible barriers are solid fats, e.g., compound fats, fats tend to repel water, and because moisture migration between compositionally dissimilar portions is one of Also known for use are a wide variety of nonfat based barrier materials. Frequently these barriers are based upon shellac or employ blends or even complex copolymers of shellac. While useful, practical utilization of these materials in the present, mass produced fruit snack food items has not yet been achieved.

The present invention provides composite food articles having distinctly dissimilar regions or portions characterized in part by marked texture differences between the portions. The present invention thus provides a dramatic improvement in fruit snack products. More specifically, the present invention provides articles having a first portion based on a fruit leather and a second portion which is perceived as fluid or juicy. The present invention, however, surprisingly overcomes the problems of the structural instability over time between two dissimilar portions. In the most preferred embodiment, the second fluid portion essentially comprises a water in oil emulsion ("w/o") characterized by surprisingly low levels of a continuous oil phase based upon a liquid oil but wherein the liquid oil contains sufficient amounts of an oil gelling agent so as to form an oil gel. The preferred fluid emulsion portion further comprises a major amount of a discontinuous aqueous phase. The aqueous phase is also characterized by high levels of water soluble solids. Such composite food articles provide the advantages of markedly different textures between the two portions. Notwithstanding these differences, the articles exhibit surprising extended structural stability.

Throughout the specification and claims percentages are by weight and temperatures by degrees Fahrenheit, unless otherwise indicated.

SUMMARY OF THE INVENTION

In its article aspect, the present invention resides in dual texture or composite food articles which exhibit surprising extended shelf life stability namely, structural stability, in that the two phases remain distinct during shelf life. The food articles comprise a first portion, preferably exterior, comprising a solid, relatively tougher food portion. The articles additionally essentially comprise a second fluid portion, preferably interior, in direct physical contact with the first portion without the necessary presence of an intermediate barrier as a separate, distinct element.

The second portion essentially comprises a water in oil emulsion. The emulsion comprises minor amounts of a continuous oil phase. The oil phase comprises fatty triglycerides or oils which are preferably, substantially liquid at room temperature. The emulsions additionally essentially comprise at least one emulsifier. The emulsions further essentially comprise a discontinuous aqueous phase. The aqueous phase comprises sufficient quantities of water soluble solids so as to have a water activity ranging from about 0.4 to about 0.8.

DETAILED DESCRIPTION OF THE INVENTION

The present invention relates to composite food products having distinctly dissimilar portions or regions characterized in part by marked texture difference between the portions yet which nonetheless exhibit enhanced shelf stability especially in terms of retention of separate portions over time, i.e., enhanced structural stability is attained. The food products comprise a first portion which is relatively tougher or more solid. The food products additionally comprise a second, more fluid portion. The second portion preferably comprises novel water in oil emulsions. Each of these food product components, their composition as well as the food product preparation and use are described in detail below.

Solid Portion

The present food compositions essentially comprise a first, solid or "hard" portion or region. The first region can range in texture in firmness but will be firm relative to the second phase. The present food products further essentially comprise a second portion or region which is distinguished from the first portion in terms of texture. It is to be appreciated, however, that the differences in texture are relative. Thus, while the first portion is relatively harder than the fluid portion, the first portion is nonetheless soft within the sense of the consumer being able to bite through the food piece or as compared to a hard candy.

In a preferred embodiment the present food products are in the form of bite size pieces wherein the first portion forms an outer or shell portion. The bite size pieces can be of any shape or size whether spherical or triangular or more complex shapes. In one preferred embodiment, the bite sized pieces are roughly disc shaped. The first or shell portion provides structure and support for the food product. In this preferred embodiment, the food products are fabricated with the second, more fluid portion comprising a core surrounded by a shell.

Compositionally, the first portion can be of any suitable plastic mass composition. Preferred for use herein, however, are fruit based compositions of the type now available in the form of fruit leathers or bar shaped pieces of such materials. These compositions are intermediate moisture compositions comprising fruit materials or solids as a principal ingredient.

Suitable intermediate moisture fruit compositions are well known in the art and the skilled artisan will have no difficulty selecting from among art composition formulations suitable for use herein. Suitable compositions are described in, for example, U.S. Pat. Nos. 4,681,770 (issued July 21, 1987 to K. L. Palmer), 4,205,093 (issued May 27, 1980 to J. R. Blake) and 4,450,179 (issued May 22, 1984 to Vink et al.), each of which are incorporated herein by reference. Generally, however, the first portion compositionally essentially comprises a hydrophilic colloid or gelling agent, fruit solids, and moisture. Preferred first portion compositions additionally essentially comprise a nutritive carbohydrate sweetening agent(s), a triglyceride or shortening ingredient, an emulsifier(s) and a flavorant(s).

Useful hydrophilic colloids or gelling agents herein include, for example, pectin, agar, carrageenan, starches, gelatin, xanthan gum, locust bean gum, flour and mixtures thereof. Preferred hydrophilic colloids include pectin, starch, agar, xanthan gum and mixtures thereof. The first portion can comprise from about 0.5% to 12% of the portion of the hydrophilic colloid, preferably about 1% to 8% and for best results about 2% to 6%. The particular hydrophilic colloid concentration value can depend upon such factors as particular material employed, moisture content, and desired organoleptic attributes.

A principal essential ingredient of the present plastic first portion is fruit solids. The fruit solids can be derived from fruit purees prepared from whole fruit flesh or if such purees have been partially dehydrated, fruit paste. The term "puree" has been used in the art to refer to both heat-treated and nonheat-treated food pulp. As used herein, however, "puree" is meant to refer both to heat-treated and nonheat-treated whole fruit pieces which have been mechanically transformed into fluids. Both seeded and unseeded purees can be used. Fruit puree generally contains about 55% to 90% moisture. The fruit solids component can also be supplied by other edible fruit portions, such as fruit pulp. Fruit pulp is the material remaining after fruit juices have been removed from fruit puree. Additionally useful herein for supplying the fruit solids are various fruit juices whether single strength or concentrated.

Fruit materials from any fruit can be used herein. Examples of such fruits useful herein include pineapple, lemon, orange, peach, pear, grape, mango, apple, tomato, blackberry, plum, blueberry, raspberry, strawberry, currant, cherry, and mixtures thereof. Preferred fruits are selected from the group consisting of strawberries, cherries, blueberries, raspberries, grapes, oranges and mixtures thereof. Most highly preferred for use herein are grapes, strawberries, oranges and cherries.

Fresh fruit, of course, can be used for preparing the products herein. However, previously frozen fruit, canned fruit, partially dehydrated fruit or rehydrated fruit, as well as frozen juices, concentrates, nectars, or frozen juice pulps are also suitable for use herein. When frozen fruit is employed, e.g., "four plus one" strawberries, i.e., frozen strawberries with one quarter part by weight added sugar, only the fruit solids contribution is to be considered.

While the present invention is primarily directed towards fruit containing products, the skilled artisan will appreciate that the present invention is equivalently applicable to all edible plant solids, especially ordinary garden variety vegetables. The sugars, flavors, acids, pectinaceous or cellulosic fibers and ash of which plant solids are typically comprised are intended to be included within the term edible plant solids. However, "edible plant solids" is not intended to include such starch fractions as wheat or other cereal flours nor oleaginous materials such as soybean oil. That is, the present fruit solids can be wholly or partially replaced with equivalent amounts of ordinary garden vegetable solids. However, vegetable flavored products are not nearly as popular as those which are fruit flavored. However, certain vegetables, e.g., pumpkin, squash and carrot enjoy some popularity as novelty items.

The present first portion compositions essentially comprise from about 4% to 30% (dry weight basis) of the composition of comminuted fruit or plant solids. Better results in terms of natural flavor and color but at economical costs are obtained when the fruit solids are present at about 10% to 18%.

In more preferred embodiments a nutritive carbohydrate sweetening agent (or, equivalently "sweeteners") is an essential ingredient and is present in the first portion at from about 0.1% to 60%. Better results in terms of flavor and low stickiness are obtained when the sweeteners comprise about 20% to 45% of the first portion's composition. For best results, the carbohydrate sweetening agent content should range from about 35% to 40%.

The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharine, cyclamate, and the like and from such protein-based sweetening agents as aspartame, thaumatin, and monellin. These materials are sometimes referred to collectively as "high potency sweeteners". High potency sweeteners, of course, can be used, if desired herein.

Suitable materials for use as nutritive carbohydrate sweetening agents are well known in the art. Examples of sweetening agents include both mono-saccharide and di-saccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, glucose, fructose, corn syrup solids, and honey. Highly preferred nutritive carbohydrate sweetening agents are those selected from the group consisting of sucrose, corn syrup solids, and fructose especially in the form of high fructose corn syrups. Of course, mixtures of the above-noted materials are contemplated herein.

In preferred embodiments, the hard portion additionally essentially comprises modest levels of a fat ingredient. The fat beneficially provides an organoleptic attribute of lubricity to the portion. If present, the fat component can comprise about 0.1% to 10% of the hard portion. Better results in terms of mouthfeel or lubricity are obtained when the fat component comprises about 0.1% to 4% of the hard portion. For best results, the fat can comprise about 4%. The art is replete with conventional fat materials suitable for use herein and the skilled artisan will have no difficulty selecting particular materials for use herein. More preferred compositions include fats which are vegetable in origin. Especially preferred are fats which are solid at room temperature although liquid oils can be employed. Liquid oils can, however, tend towards developing undesirable greasiness upon handling and oiling out which can be aesthetically undesirable.

The solid portion in certain preferred embodiments can additionally essentially comprises a release agent. The release agent functions both to facilitate release of the food product from its packaging material and also from the consumer's teeth during consumption. Emulsifiers are useful herein as release agents and useful emulsifiers are also well known to the food product artisan. Emulsifiers useful as release agents, for example, include those emulsifiers generally known to be useful in connection with fat materials. Especially useful herein are distilled monoglycerides and distilled mixtures of mono- and diglycerides. Lecithin is also a useful release agent. When present, the solid portion can comprise about 0.1% to 1.5% of emulsifier. Better results in terms of release properties balanced with cost and flavor properties are achieved when an emulsifier comprises about 0.5% to 1.25% of the hard portion. For best results, the emulsifier concentration can range from about 0.9% to 1.1%.

The first, solid portion can additionally comprise materials which provide enhanced flavor or flavor materials. These flavor materials can include an acidulant. Suitable acidulants can include an edible, non-volatile organic acid. Typically, the edible organic acids are employed at levels of from about 0.1% to 4%. A wide variety of edible organic acids or their salts are known in the food art and are usefully employed herein. Examples of suitable materials useful herein as edible organic acids include the water soluble salts of citric acid, tartaric acid, malic acid, acetic acid, lactic acid, and adipic acid. The cations of the salts of such edible organic acid can be sodium, potassium, and the like. Preferred edible organic acid salts include sodium citrate, malic acid, potassium citrate, and sodium lactate, etc.

Minor ingredients such as dyes, coloring agents and concentrated flavors can be added to the first, solid portion to improve the consumer acceptability of the present food products. If present, such agents generally comprise from about 0.1% to 4% by weight of the first portion. For example, a red color may be imparted by F.D.&C. Red No. 40 in a minor amount of, say, 0.01% for use in a raspberry or cherry-like product.

The present food products have a first, solid portion having a moisture content which ranges from about 8% to 30%. That is, the total solids level of the present food products ranges from about 70% to 92%. Superior results are obtained when the water content ranges from 12% to 20%. Maintenance of the water content within the specified ranges is important to the realization of food products having a cohesive structure as a homogeneous plastic mass which holds its shape but which is not too firm. To some extent, the moisture content influences the textural properties of the present food products. Generally, those food products with lower moisture contents exhibit tougher, more chewy characteristics.

Control of the moisture content can be obtained by limiting the amount of total water supplied to a given formulation. Alternatively and preferably, excess water can be added to a mixture of essential and optional ingredients of the present invention, and the excess water removed by conventional drying techniques. In the composition preparation which is more fully described below, prior to shaping a mixture of the present ingredients into any desired geometric configuration, the present solid portion compositions are obtained by such drying techniques as microwave or infrared radiating, oven drying, thin surface conduction heating, room drying or forced air drying to any desired moisture content within the specified moisture content range.

Importantly, the water which is contained by the present food products is present not totally in a free state but rather is partially bound. The degree to which water is bound in a food product is characterized by the water activity ("$A_w$") of the food product. The water activity of any food product will be in the range of 0.00 to 1.00. The water activity of the present food product at equilibrium (24 hours) should range from about 0.5 to 0.8. Products having first portion with a water activity too low can be unacceptably tough. Products having a first portion with water activities too high can experience microbial instability even though exhibiting acceptable structural stability. Superior results are obtained when the water activity of the present foods ranges from about 0.60 to 0.75. Products having lower water activities will exhibit tougher, more chewy attributes. Food products having higher water activities, on the other hand, will be softer and more tender organoleptically.

The water activity of the present food products is controlled by two factors. First, the moisture content of the present food products influences measured water activity. Higher moisture contents tend to increase water activities. Second, the water activities of the present food products are influenced by the water binding capacities of the ingredients employed to realize the present food products and the levels at which these materials are employed. When materials having high water-binding capacities are employed, the water activities are lower for a given moisture content. The various sweetening agents and other materials differ in their water-binding capacity and thus will influence the water activity of the present food products. Therefore, the water activity can be controlled by varying the selection and mixture of ingredients as well as their concentrations to provide products having whatever water activities and, thus, textural properties which are desired.

In those embodiments in the form of a shell fabricated from the first portion, the thickness of the shell layer while not critical per se can range from about 0.5 to 6 mm, preferably about 1 to 4 mm. For best results a thickness of about 2.5 mm is desired. Particular thickness values depend upon such factors as the strength and durability of shell or first portion, desired texture, and method of manufacture.

In another embodiment of the present invention, the first portion is in bar form, e.g., having a length ranging from about 80 to 120 mm, a width of about 20 to 40 mm, and a thickness ranging from about 5 to 15 mm. The bar can have a series of pockets or indentations or cavities into which the second portion resides. In this embodiment, the first portion acts as a structural support for the second portion. The pockets can either be regular in shape or in placement. For example, a spaced array of identically sized half spherical dimples can be employed. Of course, the second, soft portions can also be irregular in shape, orientation, spacing or distribution and can themselves vary in texture from one to another. The second, soft portion can be, if desired, covered with an additional or top layer of hard portion of comparable size. In another embodiment, the first portion substrate is provided with a series of corrugations whether longitudinal or transverse relative to the longest bar dimension. The "upper" and "bottom" layers of first portion can, of course, form a continuous mass. The articles can also be formed into other shapes, whether regular, e.g., cubes, cones, discs, or "kisses", or irregular.

Soft Phase

The present food products additionally essentially comprise a second portion in direct physical contact with the hard portion without the necessity of a separate, distinct, additional barrier intermediate therebetween. The second portion is characterized by a marked textural difference in comparison with the first portion. The second portion is generally characterized as fluid or soft relative to the first portion. The second portion is perceived as being fluid upon consumption even though at rest the portion may be dimensionally stable, i.e., the second portion can be, it is believed, a thixotropic gel.

As indicated above, in the preferred embodiment, the second portion can be fabricated into an interior or core portion. In this embodiment, the second portion can comprise about 5% to 50% of the food product. Better results in terms of providing a shell with sufficient thickness so as to provide superior structural support are obtained when the second phase comprises about 15% to 30%, and, for best results about 20% to 25% of the food product.

The second portion essentially comprises a water in oil emulsion. In certain preferred embodiments the second portion essentially comprises a novel, particularly defined, low fat content, water in oil emulsion. The emulsions essentially comprise (1) a dispersed aqueous or syrup phase, (2) at least one emulsifier for the present w/o emulsions, and (3) a continuous oil phase.

The aqueous phase is desirably high in solids, i.e., is a liquid syrup phase essentially comprising water and sufficient amounts of water soluble solids so as to provide the aqueous phase with a water activity ranging from about 0.4 to about 0.8, preferably about 0.3 to 0.7 and for best results about 0.6. The aqueous phase can comprise as water soluble solids materials comparable as to those described above for the hard portion. For example, suitable materials can include various nutritive carbohydrate sweetening agents or sugar alcohols (especially gycerol). Preferred for use herein are juice solids materials, e.g., concentrated fruit juices or nectars. Useful liquid syrup phases herein comprise about 30% to 90% solids by weight of the aqueous phase, preferably about 65% to 90%, and for best results about 72% to 84%.

In certain preferred embodiments, the aqueous phase can additionally essentially comprise an aqueous phase gelling or thickening agent. In these embodiments the aqueous phase essentially comprises about 0.05% to 5%, preferably about 0.25% to 2% of the aqueous phase of the gelling agent. Embodiments comprising a gelled or at least a thickened aqueous phase beneficially exhibit the properties of greater emulsion stability which is especially desirable at lower emulsion oil levels. The particular concentration of the gelling agent will depend upon such factors as the particular material employed, the type and amount of water soluble materials in the phase, emulsion oil content, and desired organoleptic attributes. For best results, the aqueous phase can comprise about 0.5% to 1.1% of a gelling agent. Useful as aqueous phase gelling agents are, for example, gelatin, xanthan, alginates, locust bean, guar, carboxymethyl cellulose, pectin, and mixtures thereof. Preferred for use herein are alginate, pectin, and mixtures thereof.

The aqueous phase is dispersed throughout the emulsion in the form of globules. The particle size of the globules is not critical per se and, generally, is primarily determined by the relative amounts of aqueous and oil phases. The stability of emulsion is, however, favorably influenced when the globules are relatively small and uniform in size.

The present w/o emulsions further essentially comprise a continuous oil phase. The oil phase essentially comprises an edible oil. The oil phase can comprise from as little as about 8% to about 50% by weight of the emulsion. Preferred for use herein are emulsions which comprise about 10% to about 28% by weight oil. For best results in terms of succulence and stability, an oil phase content of the emulsion ranges from about 10% to 25%. It is most surprising that a stable w/o emulsion can be formulated with such low concentrations of the continuous oil phase. Within the defined oil phase concentrations, the w/o emulsions provide the benefit of succulence. However, excessive oil concentrations are not preferred since emulsions with such high oil contents become less succulent and more creamy in texture. If the oil phase concentration is too low, the emulsion can experience emulsion instability. The emulsion can experience inversion which can lead to syneresis or weeping.

It is preferable that the oil be a liquid oil, i.e., have minimal solids at room temperature (21° C.). Unlike other margarine type compositions which have solid fat index values which predominantly are harder fats, it is believed desirable herein that the oil be liquid or largely liquid, at those temperatures to be encountered during storage and distribution. Accordingly, most preferred for use herein are liquid oils which have been winterized, i.e., cooled and strained so as to remove the fraction which becomes solid at the cooled temperatures. Preferred liquid oil materials are those having the following SFI profile:

TABLE 1

| Temperature | SFI |
| --- | --- |
| 21° C. | 0% to 16% |
| 10° C. | 7% to 35% |

Any conventional oil, especially vegetable oils can be used, e.g., soybean oil, corn oil, peanut oil, and mixtures thereof. Winterized oils are not typically described by SFI profiles, but by clouding times, i.e., the hours at 40° F. before clouding occurs. Preferred for use herein are winterized oils with high cloud times, e.g., 10 hours or better. Also useful herein but less desirable are "plastic" fats.

In preferred embodiments, especially for those embodiments wherein the oil content is less than 30%, the oil phase additionally essentially comprises an oil gelling agent sufficient to form a thickened or gelled oil. In more preferred embodiments, the oil phase essentially comprises about 2% to 6% of the oil phase of the fumed silicon dioxide which functions initially to facilitate the blending of oil soluble flavors in the oil phase and, surprisingly, also as an oil phase gelling agent. Better results in terms of texture and mouthfeel are obtained when the oil phase comprises about 3% to 5% fumed silicon dioxide. For best results, the oil phase desirably comprises about 3% of silicon dioxide.

In another preferred embodiment, the oil phase additionally essentially includes an hydroxypropylcellulose ("HPC") as a second, auxiliary gelling agent in combination with the fumed silicon dioxide. Surprisingly, the HPC synergistically interacts with the fumed silicon dioxide to cause the liquid oil to gel. HPC is, of course, commonly available in food grades and ranges, generally, in molecular weight from about 100,000 to 1,000,000 with the higher molecular weight materials being slightly preferred. Also useful herein in full or partial substitution for HPC is hydroxypropylmethylcellulose ("HPMC"). In these embodiments the oil phase essentially comprises about 0.1% to 1.5% of HPC and/or HPMC. Better results in terms of emulsion stability are obtained when the oil phase comprises about 0.2% to 0.5% and, for best results, about 0.4% HPC.

The HPC and/or HPMC is desirably dissolved in a suitable co-solvent, e.g., absolute ethanol or propylene glycol or mixtures thereof, e.g., in a solution of 90% solvent and 10% HPC, to accomplish dispersion in the oil phase.

The emulsion additionally essentially comprises at least one emulsifier in amounts sufficient to form the present emulsions. Typically, the emulsifier is added to the oil phase generally, however, prior to addition of the gelling agent. Thus expressed, good results are obtained when the oil phase essentially comprises about 0.1% to 1.5% emulsifier. For better results, the emulsifier desirably comprises about 0.2% to 1.0% of the oil phase and for best results about 0.5%. As indicated above, emulsifiers are well known and selection of useful emulsifiers herein will require no more than routine experimentation. Specific useful emulsifiers, for example, include a liquid polyglycerol oleate (available from Witco Corporation under the trade name Witconol 14F.), a distilled monoglyceride (available from Eastman Chemical Products, Inc. under the trade name Myverol 18-92) and an emulsifier available from Capital City Products under the trade name Caprol 10G40. These materials like most commercial emulsifiers are blends of materials and their use is contemplated herein. For emulsifiers solid at room temperature, the oil can be heated to assure proper dispersion.

The oil phase can optionally additionally include oil soluble flavorants, color, preservatives or vitamins. If present, these adjuvant materials can each comprise about 0.01% to about 2% of the oil phase. The emulsion can be of a color not only of a complementary but also in contrast to the color of the first portion. In preferred embodiments, the emulsions are substantially unaerated. While emulsion preparation without some air incorporation is difficult, it is not intended herein to provide aerated or whipped emulsions. It is to be appreciated that certain solid materials, e.g., nut meat pieces, fruit bits, can be optionally added to the fluid phase without departing from the spirit of the present invention.

Most surprisingly, utilization of the novel emulsions described herein allow for the fabrication of food products wherein the water activity differential between the two portions can be as great as about 0.2 while nonetheless exhibiting long term, unrefrigerated (i.e., room temperature) shelf stability. Higher water activity differentials may be possible. Of course, preferred compositions are characterized by a smaller water activity differential, i.e., less than about 0.1 for greater stability. For best stability results, the water activity differential between the two phases is desirably less than 0.05. The present food products thus provide unexpected storage stability superiority, especially compared with comparable products containing centers of simple syrup whether or not gelled or thickened. While not wishing to be bound by the proposed theory, it is speculated herein that the present novel emulsions provide a hydrophobic barrier at a molecular or microscopic level between the first portion and the dispersed aqueous phase of the emulsion.

Method of Preparation

The present dual textured food products can be prepared from individually prepared blends of the first portion and the second portion comprising the present emulsions. For example, smaller quantities of the preferred disc-shaped pieces can be hand fabricated by preparing a bottom layer of the first portion in the form of a thin sheet or leather with a number of depressions therein. The second portion comprising the present novel w/o emulsions can be deposited in the depressions. An overlayer of the first portion can then be placed over the filled piece. Individual pieces can be formed by pressing out the individual filled depressions which step causes the underlying and overlying layers of first portion to seal thereby forming a continuous shell of first portion surrounding a core of w/o emulsion. For production of larger quantities, conventional co-deposition co-extrusion equipment can be employed. The food products so prepared can be conventionally packaged for distribution and sale.

The present food products so prepared have a remarkable extended storage stability especially in terms of structural stability at room temperature while maintaining their desirable dual texture, color and appearance.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food art, can be undertaken without departing from the spirit and scope of this invention.

EXAMPLE 1

A dual texture food product of the present invention characterized by a rigid plastic shell containing a soft center and exhibiting extended shelf life stability is prepared by the following process.

Shell Formulation

The shell portion is made by first preparing a 7% aqueous pectin solution which is heated to between 180° to 200° F. and allowed to cool to ambient temperatures. This pectin solution is then combined with a slurry of the following composition:

|  | Weight % |
|---|---|
| Maltodextrin | 13.47 |
| Pear puree concentrate | 10.66 |
| Sucrose | 22.46 |
| Cherry flavor | 1.68 |
| Malic acid (50%) | 1.23 |
| Sodium citrate (33%) | 1.34 |
| Red dye | 0.04 |
| 63 DE corn syrup | 13.47 |
| Frozen strawberries | 31.20 |
| Shortening | 3.42 |
| Lecithin[1] | 0.70 |
| Citric acid (50%) | 0.33 |
|  | 100.00 |

[1] Available from Central Soya Chemurgy Div.

Thereafter, the slurry and the aqueous solution of hydrated pectin are thoroughly mixed in a vertical cutter mixer. The resulting mixture is then conveyed to a drum dryer where the moisture of the shell material is reduced to achieve a solids content of between 78 to 88 Brix.

Soft Center Formulation

The soft center consists of a water in oil emulsion which is prepared by combining a gelled aqueous phase with a gelled oil phase.

The aqueous phase is prepared from the following ingredients:

|  | Weight % |
|---|---|
| Glycerol | 2.00 |
| Crystalline fructose | 68.00 |
| Algin (gelling agent)[1] | 0.855 |
| Red dye | 0.005 |
| Dextrose | 8.00 |
| White grape juice concentrate (6% solids) | 4.80 |
| Lemon juice concentrate (400 g/l of acid expressed as citric acid) | 2.80 |
| Water | balance |

[1] Available from Kelco Division of Merck & Co., Inc. under the name Manugel PTJ.

A dry suspension of the algin is first prepared by mixing it with 10% of the fructose and the red dye. This dry mixture is then added to the water and glycerol and mixed. The remaining fructose and the dextrose is then added with slow mixing. Upon completion of the mixing, the mass is heated to 160° F. The resultant solution is allowed to cool to 100° F. after which time the juice concentrates are added to initiate gellation.

The gelled oil phase is prepared from the following ingredients:

|  | Weight % |
|---|---|
| Vegetable oil[1] | 89.83 |
| Emulsifier[2] | 1.25 |
| Oil soluble flavor | 4.18 |
| Fumed silicon dioxide[3] | 2.65 |
| Hydropropyl cellulose[4] (10% by weight in propylene glycol) | 2.09 |
|  | 100.00 |

[1] An all liquid soybean oil available from the Durkee Industrial Foods Corp. under the trade name Durkex 500.
[2] A polyglycerol ester emulsifier available from the Witco Corp. under the trade name Witconol 14-F.
[3] CAB-O-SIL M5 available from Cabot Corporation.
[4] Klucel-HF supplied by Hercules, Inc.

The vegetable oil, emulsifier, and oil soluble flavor are thoroughly mixed together. To this oil solution, 80% of the fumed silica dioxide is added gradually using a high shear homogenizer. The hydroxypropyl cellulose/propylene glycol is then gradually added to the oil phase using the same homogenizer. Thereafter the remaining 20% fumed silicon dioxide is added with additional high speed shearing.

Thereafter 85 parts of the aqueous phase are slowly added to 15 parts of the gelled oil with slow agitation in a Hobart TM mixer.

Thereafter, the shell material leaving the drum dryer at about 185° F. is run through a heated extruder which heats the material to a temperature of about 215° to 220° F. This material is next fed into a starchless molding depositor equipped to deposit a center filling. The center is introduced at ambient temperature from a separate unheated hopper. A nozzle assembly brings the center and shell material together to a concentric nozzle where they are simultaneously deposited. Starchless moulding depositor available from Baker Perkins, Peterborough, England. A 3.2 gram piece is produced which consists of 80% shell and 20% center. The dual texture product so prepared is then deposited on a coated "U" board and allowed to cool to ambient temperature after which it is packaged in foil lined craft paper pouches.

EXAMPLE 2

A dual textured food product of the present invention prepared with a shell portion prepared with the composition and in accordance with the procedure of Example 1.

Soft Center Formulation

A center portion fabricated from a w/o emulsion with an ungelled aqueous phase is prepared as follows:

| | |
|---|---|
| Water | 18.0 |
| Flavor[1] | 4.5 |
| Crystalline fructose | 67.5 |
| Dextrose | 9.0 |
| Citric acid | 1.0 |
| | 100.0 |

[1] An all liquid winterized partially hydrogenated soybean oil available from Capital City Products Company under the trade name Sta Blend.

The fructose, dextrose and citric acid are added to the water and flavor with vigorous agitation. After the addition is complete, he mass is heated to 160° to 170° F. to completely dissolve all the ingredients. This mixture is allowed to cool to ambient temperature.

The gelled oil phase is prepared from the following ingredients.

| | |
|---|---|
| Vegetable oil[2] | 90.17 |
| Emulsifier | 1.50 |
| Fumed silicon dioxide[3] (contains 20% oil soluble flavor) | 3.75 |
| Hydroxypropylcellulose (10% by weight in absolute ethanol) | 4.58 |

The gelled oil is prepared as noted above in Example 1.
[2] A polyglycerol oleate emulsifier available from the Witco Chemical Company under the trade name Witconol 14F or a decaglycerol decaoleate emulsifier available from Capital City Products Company under the trade name Caprol 10G40.
[3] An oil soluble flavor on fumed silica to make it free flowing available from Felton Worldwide under the name Natural Strawberry Fortifier or an oil soluble flavor on fumed silica to make it free flowing available from PFW Division of Hercules, Inc. under the trade name Natural Strawberry Type.

Thereafter, 89 parts of the aqueous phase are slowly added to 11 parts of the gelled oil using a low shear mixer.

Thereafter, the shell material leaving the drum dryer at about 185° F. is run through a heated extruder which heats the material to a temperature of about 215° to 220° F. This material is next fed into a starchless molding depositor equipped to deposit a center filling. The center is introduced at ambient temperature from a separate unheated hopper. A nozzle assembly brings the center and shell material together to a concentric nozzle where they are simultaneously deposited. Starchless moulding depositor available from Baker Perkins, Peterborough, England. A 3.2 gram piece is produced which consists of 80% shell and 20% center. The dual texture product so prepared is then deposited on a coated "U" board and allowed to cool to ambient temperature after which it is packaged in foil lined craft paper pouches.

What is claimed is:

1. A composite food article having a dual texture of enhanced shelf stability, comprising:
   a first solid portion comprising an intermediate moisture fruit composition in the form of a homogenous plastic mass having a water activity ranging from about 0.5 to 0.8 having a first, hard texture;
   a second thixotropic fluid portion in physical contact with the first portion having a water activity ranging from about 0.5 to 0.8 having a second, soft texture, wherein the water activities differential between the first to second portion ranges up to about 0.2, said second portion comprising a water in oil emulsion comprising
   (a) about 50% to 92% by weight of the emulsion of a discontinuous water phase, said water phase comprising sufficient quantities of water soluble solids to have a water activity ranging from about 0.4 to 0.8,
   (b) a water-in-oil forming emulsifier, and
   (c) a continuous oil phase comprising
      (1) about 8% to 50% by weight of the emulsion of an edible oil and
      (2) about 2% to 6% by weight of the oil phase of an oil gelling agent dispersed therein.

2. The food article of claim 1 wherein the gelling agent includes fumed silicon dioxide and wherein the oil has a melting point of less than 70° F.

3. The food article of claim 2 wherein the oil phase comprises about 10% to 25% by weight of the emulsion.

4. The food article of claim 3 wherein the aqueous phase comprises about 1% to 60% by weight of a nutritive carbohydrate sweetening agent, and about 1% to 60% by weight of fruit solids and wherein the oil phase additionally comprises about 0.1% to 1.5% by weight of the oil phase of a member selected from the group consisting of hydroxypropylcellulose, hydroxypropylmethylcellulose, and mixtures thereof dissolved in a solvent selected from the group consisting of absolute alcohol, propylene glycol and mixtures thereof.

5. The food article of claim 3 wherein the aqueous phase comprises about 0.05% to 2% of an aqueous phase gelling agent.

6. The food article of claim 5 wherein the oil phase comprises about 0.1% to 1.5% by weight of a member selected from the group consisting of hydroxypropyl cellulose, hydroxypropyl methylcellulose and mixtures thereof and wherein the phase comprises a solvent selected from the group consisting of absolute ethanol, propylene glycol and mixtures thereof and wherein the concentration of member in the solvent is less than about 10%.

7. The food article of claim 6 wherein the emulsifier comprises from about 0.1% to 1.5% by weight of the oil phase.

8. The food article of claim 7 wherein the first portion is in the form of a supportive shell and the second portion is in the form of a core.

9. The food article of claim 8 which is obtained by extrusion of the shell portion as a continuous rope along with the core portion simultaneously co-extruded into the hollow portion of the shell rope.

10. The food article of claim 9 wherein the core portion comprises about 5% to 50% by weight of the article.

11. The article of claim 10 in the form of a disc shaped piece ranging from about 15 to 45 g in weight.

12. The food article of claim 7 wherein the first portion is in the form of a supportive bar having a length ranging from about 80 to 120 mm, a width of about 20 to 40 mm and a thickness ranging from about 5 to 15 mm having a plurality of cavities and wherein the emulsion is positioned within the cavities.

13. The food article of claim 12 wherein the article additionally comprises an upper layer fabricated from the first portion overlying the bar.

14. A thixotropic edible water in oil emulsion of enhanced emulsion stability, comprising:
   A. about 8% to 50% by weight of the emulsion of a continuous oil phase, comprising:
      (1) an edible oil having a melting point of less than 70° F.,
      (2) about 2% to 6% by weight of the oil phase of a gelling agent;
   B. an emulsifier; and
   C. about 90% to 75% by weight of the emulsion of a discontinuous aqueous phase, comprising:
      (1) sufficient quantities of water soluble solids to have a water activity ranging from about 0.4 to 0.8 and
      (2) about 0.05% to 2% by weight of an aqueous phase gelling agent.

15. The emulsion of claim 14 comprising about 8% to 30% by weight of the emulsion oil phase and wherein the oil phase comprises about 2% to 6% by weight of the oil phase of fumed silicon dioxide.

16. The food article of claim 7 wherein the emulsion water phase has a water activity ranging from about 0.3 to 0.7 and additionally comprises fruit juice solids and wherein the oil phase comprises about 3% to 5% by weight silicon dioxide.

17. The food article of claim 16 wherein the aqueous phase comprises about 0.25% to 2% by weight of the aqueous phase of a gelling agent selected from the group consisting of gelatin, xanthan gum, abquiate gum, locust bean gum, guar gum, carboxymethyl cellulose, pectin and mixtures thereof.

18. The food article of claim 17 wherein the edible oil is winterized and has a 40° F. clouding value of greater than 10 hours.

19. The food article of claim 18 wherein the edible oil comprises about 3% by weight of the oil of fumed silicon dioxide.

20. The food article of claim 12 wherein the first portion is of one color and the second portion is of a different color.

21. The food article of claim 13 wherein the first portion is of one color and the second portion is of a different color.

22. The emulsion of claim 15 wherein the aqueous phase comprises about 1% to 60% by weight of a nutritive carbohydrate sweetening agent and wherein the oil phase additionally comprises about 0.1% to 1.5% of the oil phase of a member selected from the group consisting of hydroxypropyl cellulose, hydroxypropyl methyl cellulose and mixtures thereof dissolved in a solvent selected from the group consisting of absolute alcohol, propylene glycol and mixtures thereof.

23. The emulsion of claim 22 wherein the aqueous phase additionally comprises about 0.1% to 60% by weight of fruit solids.

24. The emulsion of claim 23 wherein the oil phase comprises about 10% to 25% by weight and wherein the oil is winterized.

* * * * *